(12) United States Patent
Zhai

(10) Patent No.: US 11,317,573 B2
(45) Date of Patent: May 3, 2022

(54) MODULAR VERTICAL WATER STORAGE GREENING SYSTEM

(71) Applicant: SOOCHOW UNIVERSITY, Suzhou (CN)

(72) Inventor: Jun Zhai, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 48 days.

(21) Appl. No.: 16/991,183

(22) Filed: Aug. 12, 2020

(65) Prior Publication Data

US 2020/0367453 A1 Nov. 26, 2020

Related U.S. Application Data

(63) Continuation of application No. PCT/CN2018/076582, filed on Feb. 12, 2018.

(51) Int. Cl.
*A01G 27/00* (2006.01)
*A01G 9/02* (2018.01)

(52) U.S. Cl.
CPC .......... *A01G 27/005* (2013.01); *A01G 9/023* (2013.01); *A01G 9/025* (2013.01)

(58) Field of Classification Search
CPC ........ A01G 9/022; A01G 9/023; A01G 9/025; A01G 9/028; A01G 27/005; A01G 27/006
USPC ..................................................... 47/82, 83
See application file for complete search history.

(56) References Cited

U.S. PATENT DOCUMENTS

| | | | | |
|---|---|---|---|---|
| 3,452,475 | A * | 7/1969 | Johnson, Sr. ......... | A01G 9/023 47/82 |
| 4,593,490 | A * | 6/1986 | Bodine ................. | A01G 9/022 47/79 |
| 6,079,154 | A * | 6/2000 | Farwell ................ | A01G 9/02 47/41.11 |
| 8,266,840 | B2 * | 9/2012 | Jung ..................... | A01G 9/023 47/82 |
| 8,950,112 | B2 * | 2/2015 | dos Santos .......... | A01G 27/005 47/82 |
| 9,578,819 | B2 * | 2/2017 | Prescott ............... | A01G 9/025 |
| 10,701,870 | B2 * | 7/2020 | Zhou .................... | A01G 27/005 |

(Continued)

FOREIGN PATENT DOCUMENTS

CN 105377019 A 3/2016
CN 106069265 A 11/2016
(Continued)

*Primary Examiner* — Lisa L Tsang
(74) *Attorney, Agent, or Firm* — SZDC Law P.C.

(57) ABSTRACT

A modular vertical water storage greening unit includes a water tank (1), a planting groove (2), and a water supply device. The water tank (1) and the planting groove (2) are arranged on a facade of a building. The planting groove (2) is installed at a front wall of the water tank (1). The water supply device includes a main water pipe (14) and a capillary tube (15). A certain amount of water is supplied to the interior of the water tank (1) so as to water a plant in the planting groove (2). A modular vertical water storage greening system includes a plurality of the modular vertical water storage greening units. Compared with conventional facade greening techniques, the unit solves the problems, such as nonuniformity watering of plants, low watering levels, and high maintenance costs.

4 Claims, 7 Drawing Sheets

(56) References Cited

U.S. PATENT DOCUMENTS

| | | | | |
|---|---|---|---|---|
| 2011/0258925 A1* | 10/2011 | Baker | | A01G 9/023 47/65.8 |
| 2013/0125459 A1* | 5/2013 | Nelson | | A01G 9/022 47/66.6 |
| 2013/0152467 A1* | 6/2013 | Chang | | A01G 9/025 47/82 |
| 2014/0075840 A1* | 3/2014 | Gosling | | A01G 27/04 47/81 |
| 2014/0083004 A1* | 3/2014 | Mackenzie | | A01G 9/025 47/66.6 |
| 2014/0115963 A1* | 5/2014 | Sung | | A01G 9/025 47/82 |
| 2018/0000026 A1* | 1/2018 | West | | A01G 9/023 |

FOREIGN PATENT DOCUMENTS

| | | | | | |
|---|---|---|---|---|---|
| CN | 206481686 | U | | 9/2017 | |
| CN | 108323352 | A | | 7/2018 | |
| EP | 3011826 | A1 | * | 4/2016 | ............ A01G 9/025 |
| GB | 2096443 | A | * | 10/1982 | ............ A01G 9/023 |
| GB | 2430856 | A | | 4/2007 | |
| JP | 2003325052 | A | * | 11/2003 | ............ A01G 9/025 |
| KR | 20060058072 | A | | 5/2006 | |
| KR | 20120007203 | A | * | 1/2012 | |
| KR | 101247700 | B1 | * | 3/2013 | |
| KR | 20140120424 | A | * | 10/2014 | |
| KR | 20170039860 | A | * | 4/2017 | |
| WO | WO-2013082191 | A1 | * | 6/2013 | ............ A01G 9/028 |
| WO | WO-2014123259 | A1 | * | 8/2014 | ............ A01G 9/025 |

* cited by examiner

MODULAR VERTICAL WATER STORAGE GREENING SYSTEM

This application is a Continuation Application of PCT/CN2018/076582, filed on Feb. 12, 2018, which is incorporated by reference for all purposes as if fully set forth herein.

TECHNICAL FIELD

The invention relates to the field of landscaping, more specifically, to a three-dimensional greening system.

BACKGROUND TECHNIQUE

With the accelerating process of urbanization, the green space in the city is occupied by all kinds of buildings, and the ecological problems such as urban heat island effect, environmental pollution, and reduction of green resources are becoming more and more serious. In order to protect the environment and improve the climate, green buildings and low-carbon energy-saving technology have been widely concerned. As one of the technical means, wall greening has been well implemented in various countries. Wall greening can not only bring people the enjoyment of beauty, but also achieve the purpose of energy saving and emission reduction, air purification and urban heat island effect mitigation.

The traditional wall greening technology can be divided into paving type, hanging type, swing flower type, bag type and plate groove type. The above five types all use drip irrigation to irrigate plants. Although plant drip irrigation has the advantages of saving water and low water evaporation, its drip irrigation pipeline is easy to be blocked. At the same time, there are some disadvantages such as insufficient uniformity of plant irrigation, small amount of irrigation, high technical cost and high labor cost of plant maintenance.

Technical Problem

The purpose of the invention is to provide a wall three-dimensional greening improvement technology, and solves the problems of insufficient uniformity of plant watering, small irrigation amount, high maintenance cost and large engineering quantity in the existing wall greening technology, etc.

Technical Solution

In order to achieve the purpose of the invention, the technical scheme adopted in the invention is as follows, A modular vertical water storage greening unit includes a water tank, a planting groove and a water supply device; the planting groove is installed on the front wall of the water tank; the water supply device includes a main water pipe and a capillary tube, which are connected with the main water pipe and the water tank; the front wall of the water tank is provided with the water holes; the rear wall of the planting groove is provided with the water holes corresponding to the drainage hole;

A method of preparing the modular vertical water storage greening unit includes the following steps: (1) preparing a water tank with the water holes on the front wall by cutting or welding a metal plate or a plastic plate; preparing a planting groove with the water holes on the rear wall by injection molding from a plastic plate; preparing a plastic main water pipe and a capillary tube by injection molding; (2) installing the planting groove on the front wall of the water tank; (3) Connect the main water pipe and the water tank with a capillary tube;

Completing the preparation of the modular vertical water storage greening unit.

In the invention, the water tank and the planting groove can be assembled and configured according to actual design requirements. Based on this, the invention also discloses a modular vertical water storage greening system, which includes a plurality of modular vertical water storage greening units. The modular vertical water storage greening unit includes a water tank, a planting groove and a water supply device; the planting groove is installed on the front wall of the water tank; the water supply device includes the main water pipe and the capillary tube, and the capillary tube connects the main water pipe and the water tank. The front wall of the water tank is provided with the water holes; the rear wall of the planting groove is provided with the water holes corresponding to the drainage hole.

A method of preparing the modular vertical water storage greening system includes the following steps: (1) preparing a water tank with the water hole on the front wall by cutting or welding a metal plate or a plastic plate; preparing a planting groove with the drainage hole on the rear wall by injection molding from a plastic plate; preparing a plastic main water pipe and the capillary tube by injection molding; (2) arranging the water tank up and down; installing the planting groove on the front wall of the water tank; (3) connecting a main water pipe and each floor water tank with the plurality of capillary tubes;

Completing the preparation of the modular vertical water storage greening system.

In the invention, the water tank and the planting groove conform to the definition of the conventional tank, for example, the upper end opening can hold water or soil, plants, and so on. According to the actual installation state, the side against the wall is called the rear wall, and the corresponding one is the front wall. The water tank is disposed on the façade of the building and communicates with the water supply device. The planting groove is installed on the front wall of the water tank, optimally, is mounted on the front wall of the water tank by hanging, and the water tank can be arranged through the corresponding arrangement of the water hole and the drainage hole. The water in the plant is introduced into the planting groove for irrigation; in general, the modular vertical water storage greening system includes a water tank and a plurality of planting grooves. Preferably, the flow hole is an overflow opening, that is, the flow hole is a concave opening structure formed by the uppermost end of the front wall of the water tank, so that the uppermost end of the planting groove is correspondingly provided with a concave opening structure as an overflow port; The uppermost end is provided with an overflow port to prevent the water from scouring the soil components in the planting groove, so that the plants are evenly watered, which is beneficial to the healthy growth of the plants to the greatest extent, and the planting groove can set the most soil substrate; one planting groove is not only design one overflow port but also design two overflow ports.

In the invention, the water supply device includes a main water pipe and a capillary tube, and the capillary tube connects the main water pipe and the water tank. By inputting a certain amount of water into the water tank, the water can be introduced into the planting groove to water and maintain the plants in the planting groove, in a water storage tank. In the modular vertical greening system, a main water pipe is provided, and each layer of the modular vertical water storage greening system is provided with a capillary tube for connecting the water tank with the main water pipe.

Preferably, the longitudinal section of the water tank is inverted triangle, that is, the water tank is composed of a rear wall, a front wall and a side wall, and the rear wall is arranged in parallel with the wall surface, and is provided with a fixing hole fixed to the wall surface through the fixing hole, The wall is inclined, the lower part is connected with the rear wall to form the bottom surface of the water tank, and the upper part is provided with an overflow port for watering the plants in the planting groove. Preferred, the angle between the front wall and the rear wall of the water tank is 30 degrees. The water tank of the invention adopts an inverted triangular structure with an angle of 30 degrees between the front wall and the rear wall, and the planting groove is arranged in parallel with the front wall of the water tank, which is beneficial to ensure the damage caused by the planting groove and the water tank to the building itself, and the pressure of the planting groove on the water tank. It is small and the water tank itself has relative stability. In addition to storing the water supplied in the water supply system and the rainwater in the natural environment, the water tank acts as a hook on the other hand, carried the gravity of the planting groove, facilitating reorganization and disassembly.

In the invention, the lower end of the side wall of the water tank is provided with a connection port for connecting the capillary tube in the water supply device, and the inverted triangle structure of the water tank is used for storing a certain amount of water, and the plants in the planting groove are watered through the overflow port; Preferred the diameter of the connection port is 40 mm; the inlet water level of the capillary tube is located at the bottom of the water tank, and the water inside the water tank is flowed while the water is being transported to prevent the water from being odorized due to the lack of renewal of the water at the bottom of the water tank; optimally, the water tank is provided in the water tank. The water blocking plate does not contact with the bottom of the water tank to form a transfer port, so that when the water is slowly transferred through the capillary tubes to the connection port of side wall of the water tank, the water surface of the water storage space composed of the water blocking plate as the side wall is always maintained at the same level. When the water surface reaches the overflow, the plants in the planting groove can be watered. When the water is connected to the joint below the side wall of the tank, the water at the bottom of the tank starts to move due to the pressure due to the flow characteristics of the water. In the same way, each transmission port will be moved by the pressure of water, and the water will always move below, so that the original stored water is updated and avoided. Water stank. The number of water blocking plates is generally designed according to the number of overflow ports, which is one less than the number of overflow ports, so that each overflow port is independently located in one water storage space, and the distance between the water blocking plate and the bottom surface of the water tank is preferably 100. Millimeter can form the pressure of water flow without affecting the flow of water too much; it is an effective way to avoid uneven watering due to insufficient pressure in the water pipe.

Preferably, the planting groove is fixed to the front wall of the water tank through a curved branch portal, and the curved hanging hole is integrally formed with the rear wall of the planting groove, and more optimally, the curved hanging hole is disposed at the upper end of the rear wall of the planting groove, and a further optimal. The ratio of inner arc radius, outer arc radius and the thickness of front wall of water tank is 1:3:2, for example, the inner arc radius is 30 mm, the outer arc radius is 30 mm, and the thickness of the front wall of the water tank is 20 mm, so that the suspension is stable; for its firmness, it is preferable that the protruding length of the curved branch portal is ≥80 mm; optimally, the front wall and the rear wall of the planting groove are parallel to the front wall of the water tank. Safety and stability are the most important when the three-dimensional greening is set on the outer surface of the building. In particular, the present invention adopts a simple and convenient suspension method, which is considered to be unstable in the prior art, but the invention combines the structure of the water tank and the planting groove. The design and the structural features of the curved branch portal enable the planting groove to be stably suspended on the outer wall of the tank, which can resist the blow of the wind.

In the invention, the planting groove is provided with a soil substrate and a plant, and the plant can be cultivated. Optimally, the soil substrate consists of artificial filling layer, planting soil layer and covering layer from bottom to top, which is not only facilitate the spread of the plant roots, but also avoid soil loss.

Preferably, the count of leakage holes is 3 to 4 to discharge excess water; and the outside of the water leakage hole is provided with a mud net; the mud net is installed in the planting groove by screws. The outside of the bottom can be easily replaced at regular intervals while blocking soil erosion.

The invention also discloses a preparation method of a modular vertical water storage greening unit, comprising the following steps:

(1) Preparing a water tank with the water holes on the front wall by cutting or welding a metal plate or a plastic plate; preparing a planting groove with the drainage hole on the rear wall by injection molding from a plastic plate; preparing a plastic main water pipe and a capillary tube by injection molding;

(2) Installing the planting groove on the front wall of the water tank;

(3) Connecting the main water pipe and the water tank with a capillary tube;

Completing the preparation of the modular vertical water storage greening unit.

Preferably, (1) Cutting and welding by metal plate or plastic plate to prepare a water tank with an overflow port on the front wall and a connecting port on the side wall; the rear wall of the plastic plate is injection-molded to have a curved branch portal and an overflow port, and the bottom is provided with the leakage hole. Planting groove; injection molding of plastic main water pipe and capillary tube;

(2) Hanging the planting groove on the front wall of the trough; planting the required soil substrate into the planting groove and planting the plant;

(3) Connecting the main water pipe and the water tank with a capillary tube;

Completing the preparation of the modular vertical water storage greening unit.

More preferably, (1) Cutting and welding by metal plate or plastic plate to prepare a water tank with an overflow port on the front wall and a connecting port on the side wall; the rear wall of the plastic plate is injection-molded to have a curved branch portal and an overflow port, and the bottom is provided with the leakage hole. Planting groove; injection molding of plastic main water pipe and capillary tube; preparation of a water-repellent plate similar to the shape of the water tank interface;

(2) The water blocking plate is installed in the water tank by welding, corresponding to the overflow port; the planting groove is suspended on the front wall of the water tank; the soil substrate required for planting is built in the planting groove, and the plant is planted;

(3) Connecting the capillary tube to the water tank through the connection port;

Completing the preparation of the modular vertical water storage greening unit.

The invention also discloses a method of preparing a modular vertical water storage greening unit, comprising the following steps:

(1) Preparing a water tank with the water holes on the front wall by cutting or welding a metal plate or a plastic plate; preparing a planting groove with the drainage hole on the rear wall by injection molding from a plastic plate; preparing a plastic main water pipe and a capillary tube by injection molding;

(2) Arranging the water tank up and down; installing the planting groove on the front wall of the water tank;

(3) Connecting a main water pipe and each floor water tank with the plurality of capillary tubes;

Completing the preparation of the modular vertical water storage greening unit.

Preferably, (1) Cutting and welding by metal plate or plastic plate to prepare a water tank with an overflow port on the front wall and a connecting port on the side wall; the rear wall of the plastic plate is injection-molded to have a curved branch portal and an overflow port, and the bottom is provided with the leakage hole. Planting groove; injection molding of plastic main water pipe and capillary tube;

(2) Arranging the water tank up and down; hanging the planting groove on the front wall of the water tank; planting the required soil substrate in the planting groove and planting the plant;

(3) Connecting the main water pipe and each floor water tank with the plurality of capillary tubes;

Completing the preparation of the modular vertical water storage greening unit.

More preferably, (1) Cutting and welding by metal plate or plastic plate to prepare a water tank with an overflow port on the front wall and a connecting port on the side wall; the rear wall of the plastic plate is injection-molded to have a curved branch portal and an overflow port, and the bottom is provided with the leakage hole. Planting groove; injection molding of plastic main water pipe and capillary tube; preparation of a water-repellent plate similar to the shape of the water tank interface;

(2) The water blocking plate is installed in the water tank by welding, corresponding to the overflow port; the water tank is arranged up and down; the planting groove is suspended on the front wall of the water tank; the soil substrate required for planting is built in the planting groove, and the plant is planted;

(3) Connecting a main water pipe and each floor water tank with the plurality of capillary tubes;

Completing the preparation of the modular vertical water storage greening unit.

For example:

(1) Making the water tank: the water tank is cut and welded by a metal plate or a plastic plate. The end face of the water tank is inverted triangle, the rear wall is parallel to the wall surface, the front wall is inclined outward, and the angle with the rear wall is 30 degrees, and the front wall is provided at the top. The overflow port is connected with the planting groove, and the lower end of the side wall is provided with a connecting port for connecting the capillary tube, the connecting port has a diameter of 40 mm, and the front wall of the water tank has a thickness of 20 mm; the water blocking plate is cut by a metal plate or a plastic plate, and is welded at In the water tank, the distance from the bottom of the water tank is 100 mm;

(2) Making the planting groove: The planting groove is made of plastic material. The top of curved branch portal is suspended on the front wall of the water tank by a curved branch portal, which the inner arc radius is 10 mm, outer arc radius is 30 mm. The plastic material is processing easily, the production planting groove can make mould, one step molding, forming and low cost; the bottom of the planting groove is provided with the leakage hole with a diameter is about 10 mm, in order to prevent the root of the plant from being necrotic due to excessive water in the planting groove;

(3) Fixed water tank and planting groove: On the outer facade of the building, the expansion screws are fixed on the wall through the fixing holes on the rear wall of the water tank. When preparing the modular vertical water storage greening system, the water tank is arranged up and down; the expansion screw model is M8×100, the diameter of the screw is 8 mm, the diameter of the casing is 10 mm; the planting groove is suspended on the front wall of the trough; the soil substrate required for planting is built into the planting groove, and the plant is planted; the plant is drought tolerant and resistant. Soaking plants, even in the rainy season or rainy areas, are not prone to rot by plants for too long, without frequent plant changes, and the cost is low;

(4) Water supply device: The water supply device includes a main water pipe and a capillary tube, and is prepared by injection molding; when the water volume reaches a certain upper limit, the capillary tubes connected to the main water pipe stops the input of water into the water tank, and if the water quantity is insufficient, the capillary tube continues to input the water amount into the water tank, when the water quantity Arrive at the overflow port and irrigate the plants in the planting groove; the main water pipes and capillary tubes material are PVC plastic pipes, for example, the main water pipe has an outer diameter of 100 mm and the capillary tube outer diameter is 40 mm.

The invention further discloses the application of the above-mentioned modular vertical water storage greening unit in vertical greening of building exterior walls. Compared with the traditional dropper irrigation, the invention avoids the nonconformity of watering caused by the difference of the pressure inside the pipe due to the distance from the water source; the prior art has a stronger pressure from the dropper which is closer to the water source, so the planting groove is also obtained. Fully watering; on the contrary, the dropper is far from the water source, the pressure is relatively weak, and it takes a long time for the planting groove to be fully watered. The arrangement of the present invention avoids this situation, enables plants to be uniformly watered, and utilizes the healthy growth of plants.

The invention also discloses a method for performing stereo greening by using the above-mentioned water storage type modular vertical greening unit. The method includes the following steps: injecting water of the main water pipe into the water tank through the capillary tube, and then draining the water into the planting groove through the overflow port, Plants in the planting groove are irrigated, and excess water is discharged from the leaking holes.

Beneficial Effects

The present invention has the following advantages over the prior art: The modular vertical water storage greening system disclosed by the invention is used for the three-dimensional greening construction of the wall, and the process is simple and easy to operate, and solves the problems of large water consumption for watering and high maintenance cost, and saves water resources and human resources while having the same. The role of improving the environment and purifying the air is satisfied with the development requirements of today's "low-carbon society."

DRAWINGS

Figure 1:
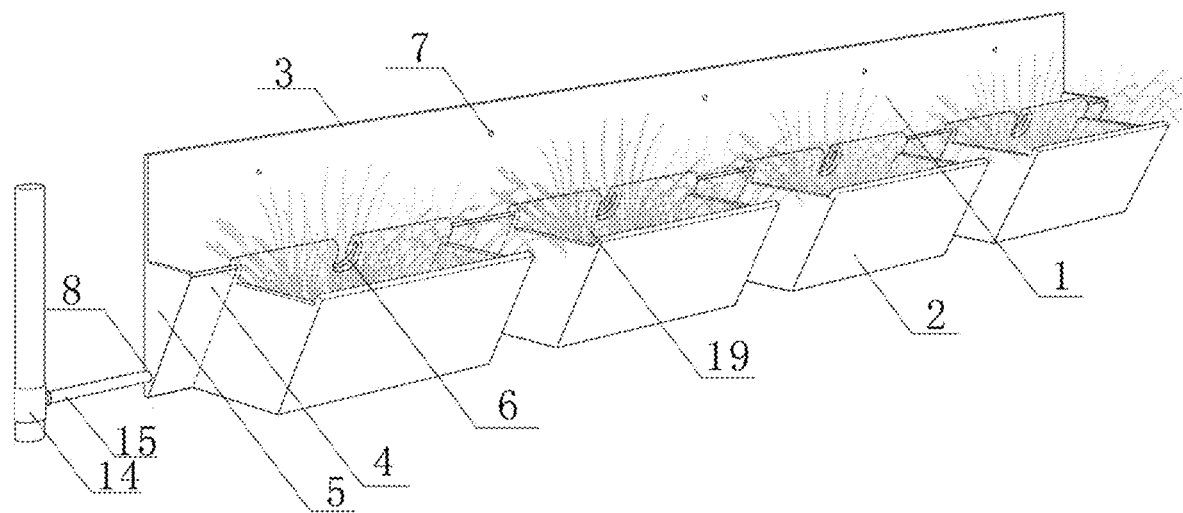
FIG. 1 is three-dimensional structure diagram of a modular vertical water storage greening system according of Example 1.
Figure 2:
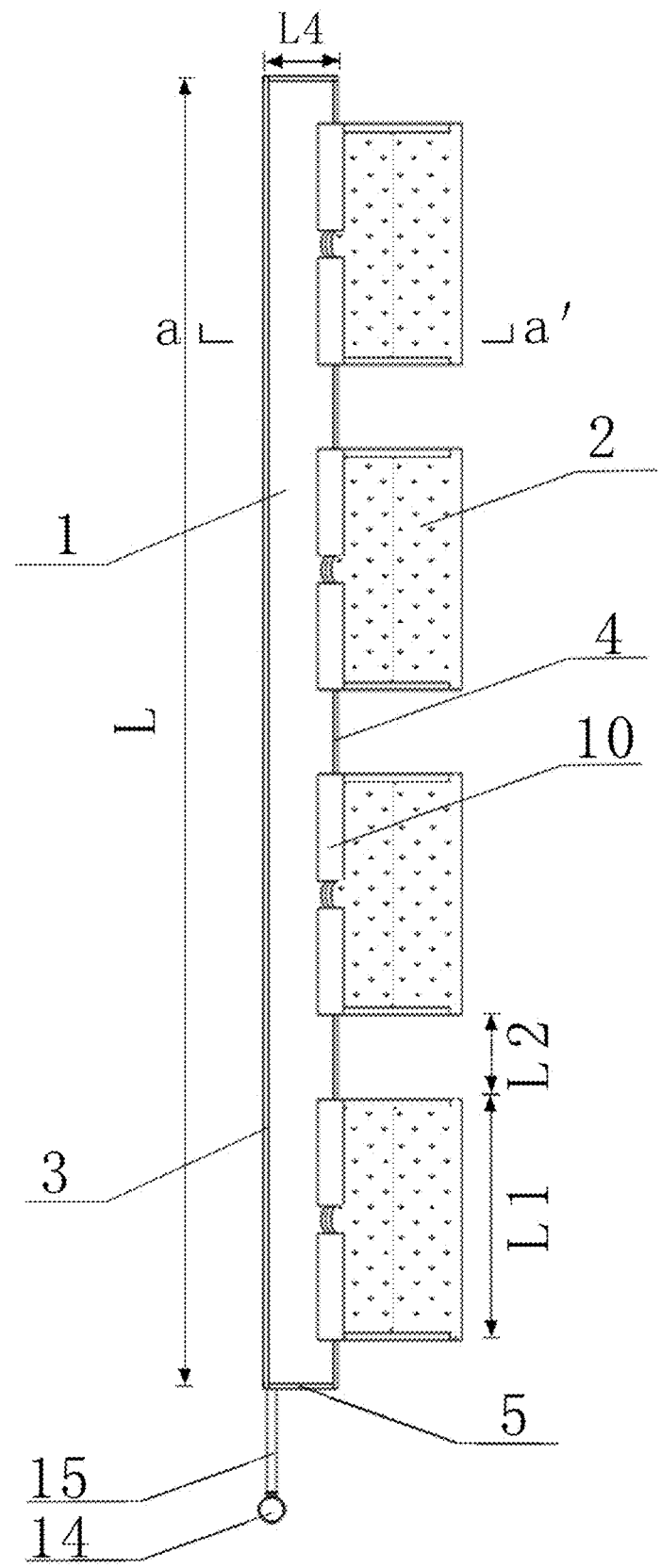
FIG. 2 is top view structure diagram of a modular vertical water storage greening system of Example 1.
Figure 3:
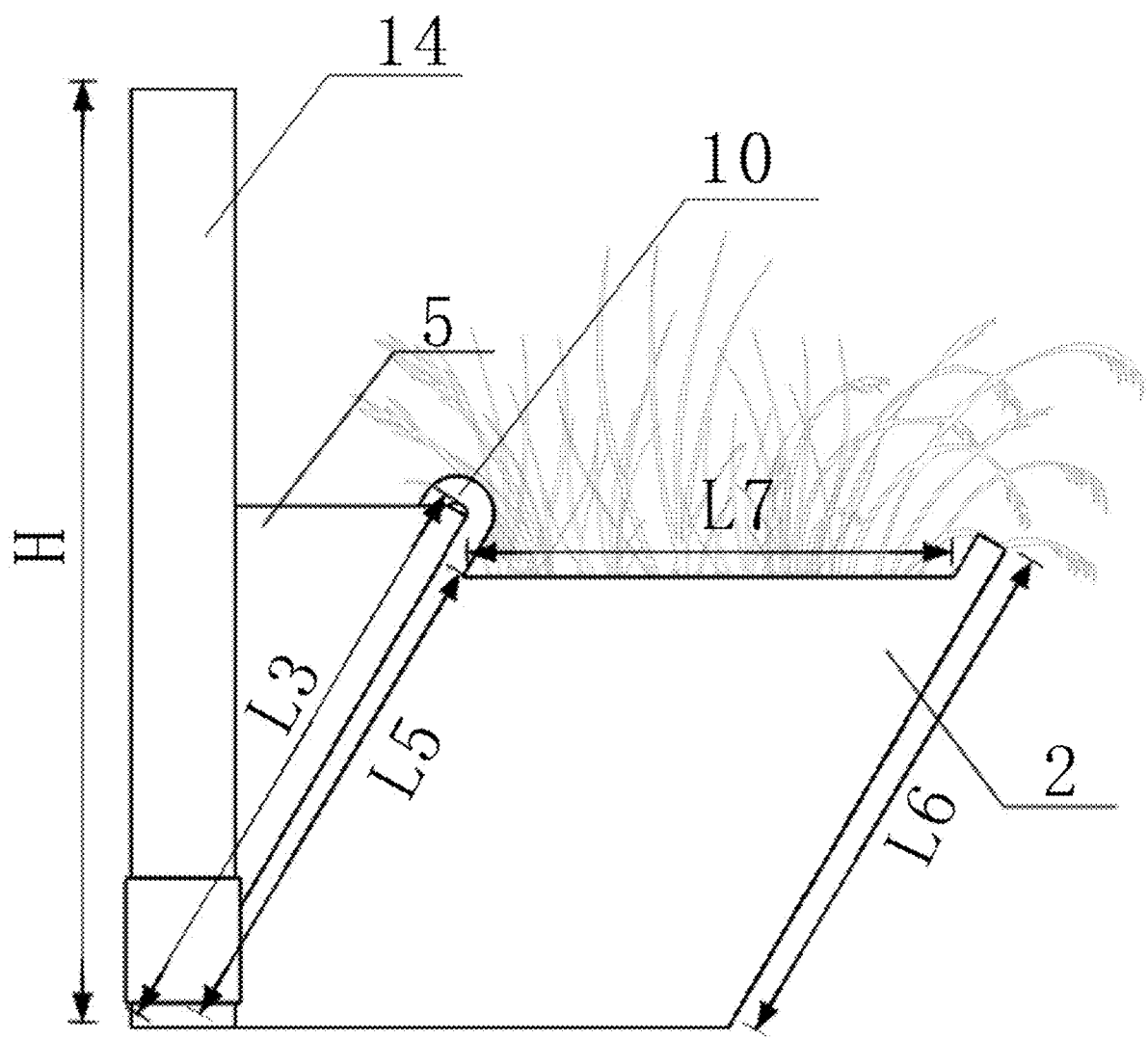
FIG. 3 is a schematic left side view of a modular vertical water storage greening system of Example 1.
Figure 4:
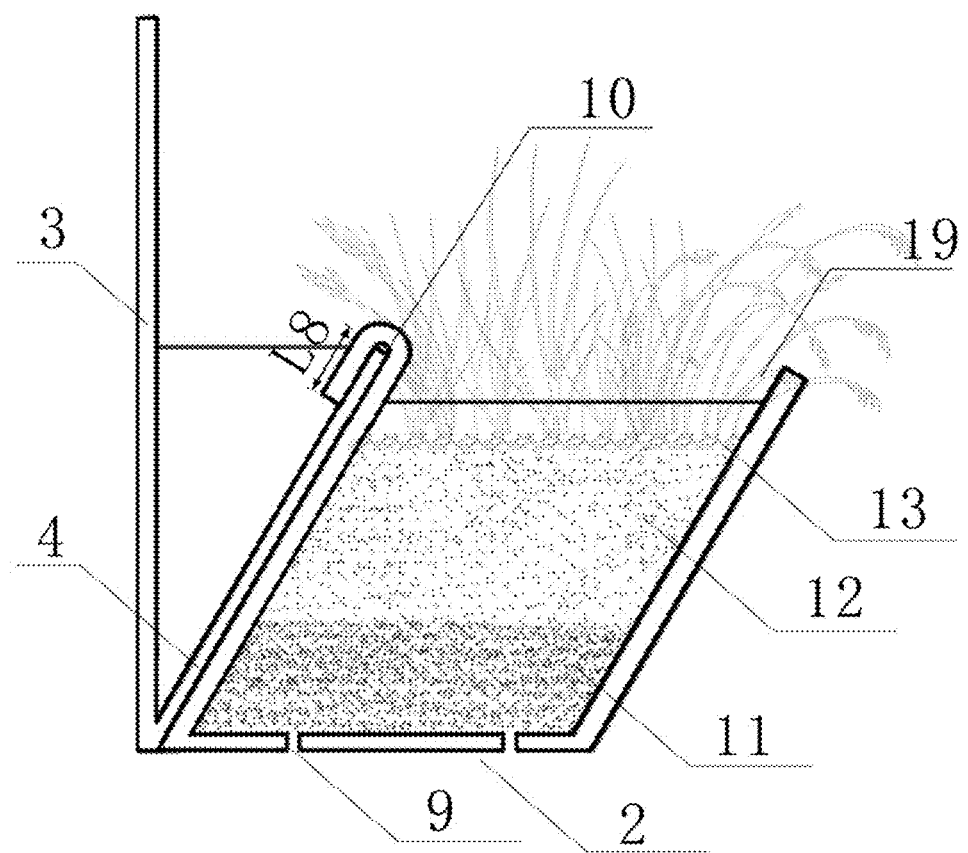
FIG. 4 is a schematic cross-sectional structural view of a modular vertical water storage greening system of Example 1.

Wherein: the water tank 1, the planting groove 2, the rear wall 3 of the water tank, the front wall 4 of the water tank, the side wall 5 of the water tank, the overflow port 6, the mounting hole 7, the connecting port 8, the water leakage hole 9, the curved branch portal 10, artificial filler layer 11, planting soil layer 12, cover layer 13, main water pipe 14, capillary tube 15, fender 16, partition 17, transfer port 18, plant 19.

EXAMPLES OF THE INVENTION

The technical solutions in the Examples of the present invention are described in detail below with reference to the accompanying drawings:

Example 1

Referring to FIGS. 1-4, a modular vertical water storage greening unit includes a water tank 1, four planting grooves 2 and a water supply device; a rear wall 3 of the water tank is provided with a mounting hole 7; and the front wall of the water tank 4 is provided with an overflow The flow port 6 has a corresponding overflow port on the rear wall of the planting groove. For the sake of simplicity, the two overflow ports are represented by the same number, and the overflow port is used for watering the plants in the planting groove, and is located at the rear wall of the planting groove. The middle of the upper end; the rear wall of the water tank is arranged in parallel with the wall surface, and can be fixed to the wall surface through the fixing hole, the front wall of the water tank is inclined, and the lower end of the side wall 5 of the water tank is provided with a connection port 8, and the front wall and the rear wall of the water tank are clamped. The angle is 30 degrees; the planting groove is suspended from the front wall of the water tank through a curved hanging hole 10 provided at the upper end of the rear wall, and the radius of the curved hanging hole is 10 mm; the water supply device includes a main water pipe 14 and a capillary tube 15, and the capillary tube connects the main water pipe with The longitudinal section of the trough is an inverted triangular structure; the front and rear walls of the planting groove are parallel to the front wall of the trough; the soil trough is provided in the planting groove for cultivating the plant 19; the soil substrate includes, from bottom to top, an artificial packing layer 11, a planting soil layer 12, and a cover layer 13; the bottom of the planting groove 9 is provided with four leakage holes, the diameter of a leakage hole is 10 mm, discharge the excessive water, in order to prevent excessive cultivation of the water tank, resulting in necrosis of plant roots. Repeated parts are marked in one place in the drawing, and conventional parts such as screws, walls and the like are not marked.

Using the curved branch portal in the above, the inner arc radius is 10 mm, outer arc radius is 30 mm, the thickness of the front wall of the water tank is 20 mm. the overflow port is semi-circular, and the diameter is 100 mm. For its firmness, the curved branch portal is preferred. The extended length L8 is 80 mm; the length L of the water tank is 5450 mm, the length L1 of each planting groove is 1000 mm, the spacing L2 of the planting groove is 350 mm; the height H of the rear wall of the water tank is 900 mm, the length of the front wall is L3. It is 580 mm. The width L4 is 290 mm; the rear wall length L5 of the planting groove is 500 mm, the front wall length L6 is 530 mm, and the width L7 is 470 mm.

The preparation method of the modular vertical water storage greening unit comprises the following steps:

(1) The water tank is cut and welded to prepare a water tank with an overflow port on the front wall; the plastic wall is injection-molded to prepare a rear wall with a curved branch portal and an overflow opening, and a planting groove with the leakage hole at the bottom and a capillary tube;

(2) Hanging the planting groove on the front wall of the trough; planting the required soil substrate into the planting groove and planting the plant;

(3) Connecting the main water pipe and the water tank with a capillary tube;

Completing the preparation of the modular vertical water storage greening unit.

Example 2

Figure 5:
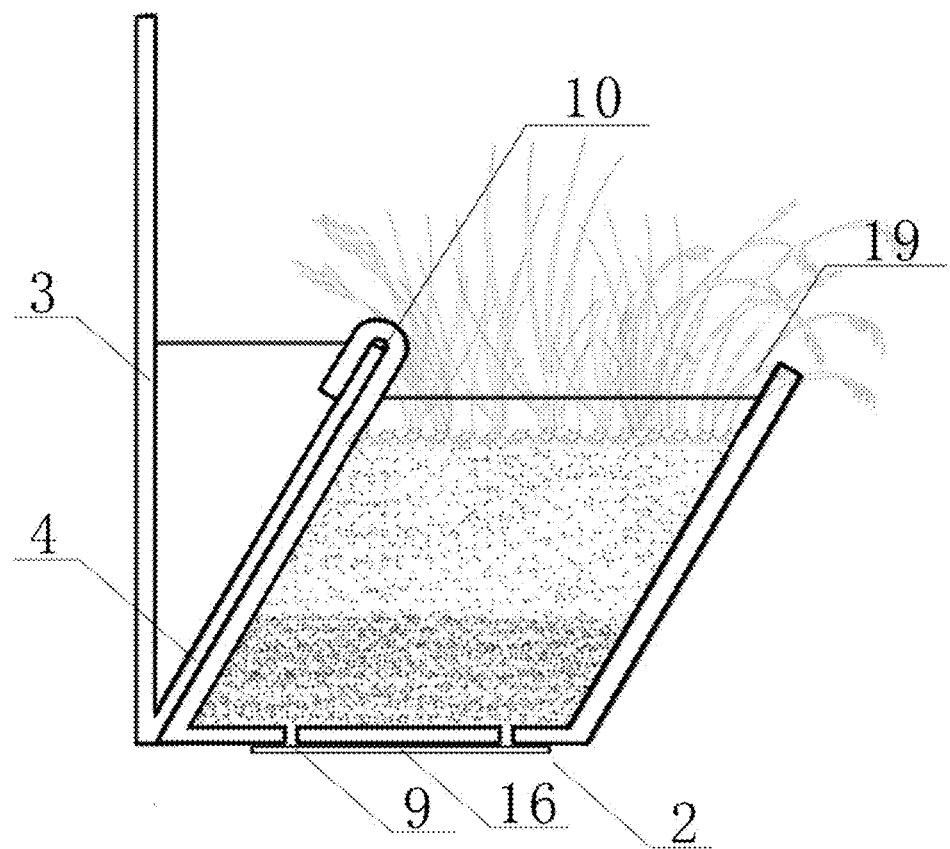
FIG. 5 is a schematic cross-sectional structural view of a modular vertical water storage greening system of Example 2.
Figure 6:
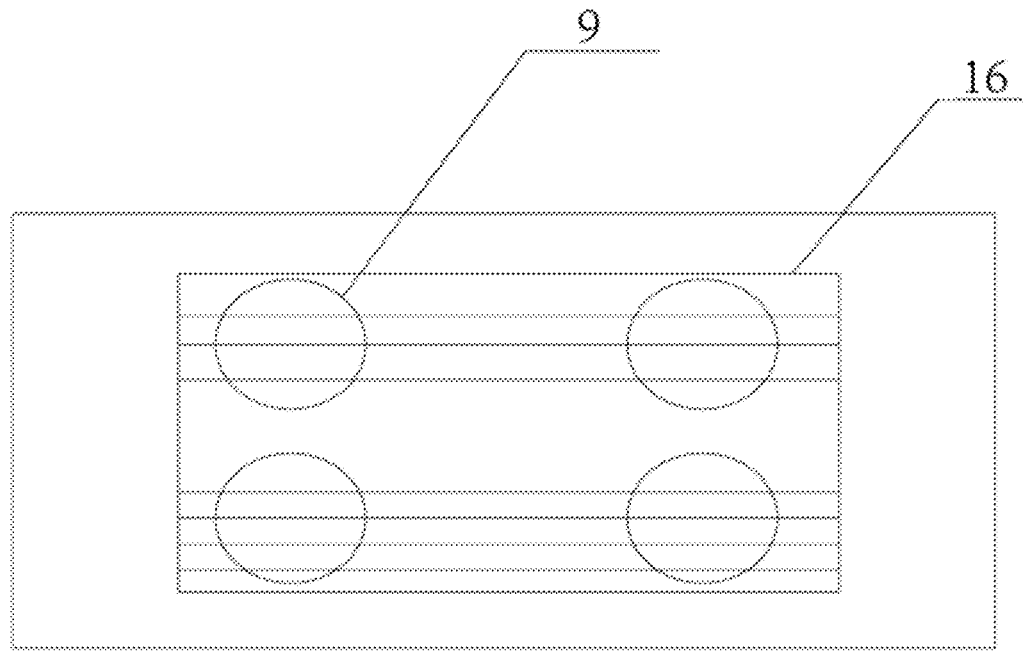
FIG. 6 is a schematic structural view showing the outside of the bottom surface of the planting groove of the modular vertical water storage greening system of the second Example 2.

A modular vertical water storage greening unit, which is the same with Example 1, except the mudguard net 16 is arranged outside the leakage hole 9. The cross-sectional view of the planting groove is shown in FIG. 5. The net is installed on the outside of the bottom of the planting groove by screws, and can be easily replaced at regular intervals while blocking soil erosion. The method of preparing the modular vertical water storage type greening unit is similar to Example 1, except that one step further prepares the mud net prepared by the conventional method by screws on the outside of the bottom of the planting groove.

Example 3

Figure 7:
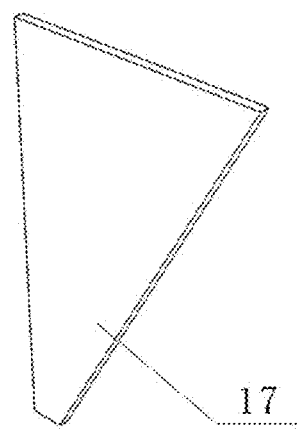
FIG. 7 is a schematic structural view of a third water blocking plate of Example 3.
Figure 8:
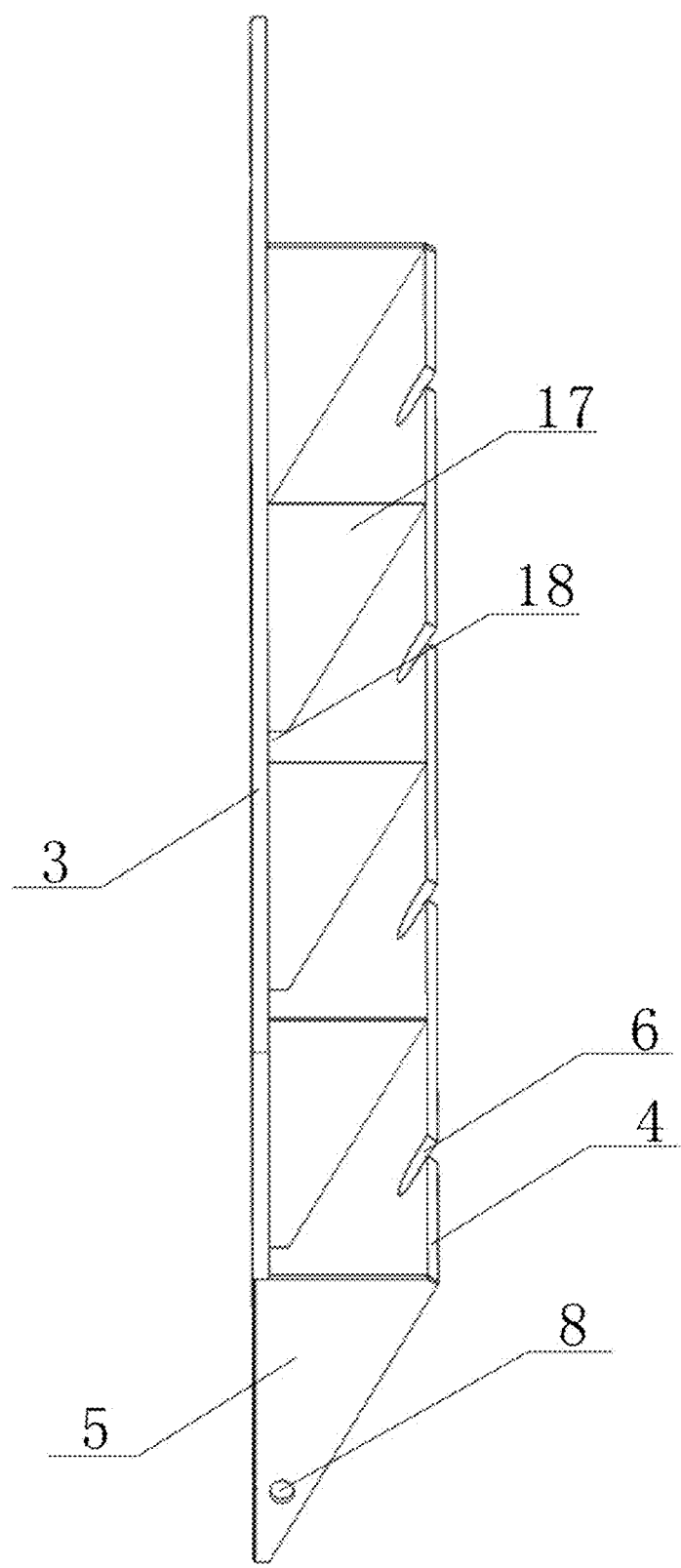
FIG. 8 is a schematic perspective view showing a three-dimensional structure of a modular vertical water storage greening system according to Example 3.

A modular vertical water storage greening unit, which is similar to Example 1, except three water blocking plates 17 with thickness of 10 mm and spacing is 1340 mm are arranged in the water tank, the upper end of the water blocking plate is flush with the upper end of the water tank, and the lower end is 100 mm away from the bottom of the water tank. 3 is formed into a three-transport port 18 with the bottom of the water tank, and the water tank is divided into four water storage spaces for the bottom. FIG. 7 is a schematic diagram of the structure of the water-blocking board, and FIG. 8 is a schematic view of the structure of the water tank; FIG. 8. When the water is slowly fed through the capillary tube port to the connection port 8 of the side wall of the water tank, the water surface of the four water storage spaces is always kept at the same level. When the water surface reaches the overflow port, the plants in the planting groove can be watered. When water is connected to the connection port below the side wall of the water tank, due to the flow characteristics of the water, the water at the bottom of the water tank starts to move due to the pressure. Similarly, each transmission port is moved by the pressure of water. The original stored water is updated to avoid water odor. When using a pressure gauge for pressure test, it is found that the water flow pressure in the upper part of the water storage space is 70% of the water flow pressure near the transmission port. The preparation method of the water storage type modular vertical greening unit above is similar to Example 1, except that the water blocking plate prepared by the conventional method is installed in the water tank by welding.

Example 4

A modular vertical water storage greening system, there are five layers of the modular vertical water storage greening units of Example 1.

The preparation method of the water storage type modular vertical greening system above comprises the following steps:

(1) The water tank is prepared by cutting or welding a metal plate or a plastic plate to prepare a water tank having an overflow port on the front wall; the rear wall of the plastic plate is injection-molded to have a curved branch portal and an overflow port, and a planting groove having the leakage hole at the bottom; main water pipes and capillary tubes;

(2) Arranging the water tank up and down; hanging the planting groove on the front wall of the water tank; planting the required soil substrate in the planting groove and planting the plant;

(3) Connecting a main water pipe and each floor water tank with the plurality of capillary tubes;

Completing the preparation of the modular vertical water storage greening system.

Example 5

By the method of modular vertical water storage greening unit of Example 1 or the modular vertical water storage greening system of Example 4, which is applied to the vertical greening of the building exterior wall to three-dimensional greening. On the wall surface, on the outer facade of the building, the expansion screw is fixed on the wall through the fixing hole of the rear wall of the water tank. The expansion screw type is M8×100, and the size of the drill bit is 10 mm; the water of the main water pipe is passed through the capillary tube. The water is injected into the water tank, and the water is drained into the planting groove through the overflow port to irrigate and maintain the plants in the planting groove, and excess water is discharged from the water leakage hole. When the water volume reaches a certain upper limit, the capillary tube connected to the main water pipe stops the input of water into the water tank. If the water volume is insufficient, the capillary tube will continue to input the water into the water tank. When the water reaches the overflow port, the plants in the planting groove will be irrigated; The planting groove is built with the soil substrate required for planting, planted into plants, and the plants are drought-tolerant and water-resistant plants. Even in rainy or rainy areas, plants are not prone to decay due to soaking water for too long. There is no need to change plants frequently and the cost is lower.

Example 6

A modular vertical water storage greening system, there are eight layers of the modular vertical water storage greening units of Example 3. The preparation method is similar to that of Example 4 except that a water blocking plate is installed in the water tank. When performing three-dimensional greening, it is similar to Example 5, wherein the difference is that water enters the capillary tube from the main water pipe, and then enters the water tank from the capillary tube, and continuously advances from the transmission port, and the water inside the water tank flows while water is being delivered. It is prevented from becoming odorous due to the lack of renewal of the water at the bottom of the water tank, and it is also avoided that the watering unevenness is caused by insufficient pressure in the water pipe. According to the actual test, the cleaning cycle of Example 4 sink is 2 months, and the cleaning cycle of the sixth Example sink is 3 months, and the presence of the water barrier reduces the deterioration of the water quality.

The wall three-dimensional greening system of the invention has simple construction process and easy operation, has the functions of improving the environment and purifying the air, and is actually planted outdoors in spring and summer for five months, the plant survival rate is 100%. There is no loss of soil, and the water consumption is 60% of the current amount of plant greening. It is satisfied with the development requirements of contemporary low carbon society.

The invention claimed is:

1. A modular vertical water storage greening unit comprising:
   a water tank;
   a planting groove; and
   a water supply device,
   wherein the planting groove is installed on a front wall of the water tank; the water supply device includes a main water pipe and a capillary tube, the capillary tube being connected with the main water pipe and the water tank; the front wall of the water tank is provided with water holes; and a rear wall of the planting groove is provided with drainage holes corresponding to the water holes;
   wherein the planting groove is mounted on the front wall of the water tank by suspension; the water holes and the drainage holes are both overflow ports; a soil substrate and a plant are arranged in the planting groove; the rear wall of the water tank is provided with a mounting hole;

a longitudinal section of the water tank is an inverted triangle structure; the front wall of the water tank is inclined, and a lower end of a side wall of the water tank is provided with a connecting port; a bottom of the planting groove is provided with leakage holes; a front wall and a rear wall of the planting groove are parallel to the front wall of the water tank; and the capillary tube communicates with the water tank through the connecting port; and wherein an angle between the front wall and the rear wall of the water tank is 30 degrees; and the planting groove is suspended on the front wall of the water tank by a curved branch portal; the soil substrate consists of an artificial filling layer, a planting soil layer and a covering layer from bottom to top; a number of the leakage holes is 3 to 4; an outside of the leakage hole is provided with a mudguard net; the water tank is provided with a vertical water blocking plate that divides the water tank into a plurality of water storage spaces; the water blocking plate is not in contact with a bottom of the water tank to form a transfer port so that when water is added to the water tank through the capillary tube and connecting port, a water level of each of the plurality of water storage spaces is the same.

2. The modular vertical water storage greening unit according to claim 1, wherein the modular vertical water storage greening unit is applied to a greening of a building exterior wall.

3. A modular vertical water storage greening system comprising:
    a plurality of units that are vertically arranged,
    wherein each of the units is the modular vertical water storage greening unit of claim 1.

4. The modular vertical water storage greening system according to claim 3, wherein the modular vertical water storage greening system is applied to a greening of a building exterior wall.

* * * * *